United States Patent [19]

Kohata et al.

[11] Patent Number: 5,135,067
[45] Date of Patent: Aug. 4, 1992

[54] ELECTRIC POWER STEERING SYSTEM

[75] Inventors: Takashi Kohata; Masaru Abe; Ikuo Nonaga, all of Saitama, Japan

[73] Assignee: Honda Giken Kogyo Kabushiki Kaisha, Tokyo, Japan

[21] Appl. No.: 563,413

[22] Filed: Aug. 6, 1990

[30] Foreign Application Priority Data

Aug. 7, 1989 [JP] Japan .................... 1-92666

[51] Int. Cl.$^5$ .......................... B62D 5/04
[52] U.S. Cl. ...................... 180/79.1; 180/140; 180/142; 280/91; 318/648; 318/653
[58] Field of Search .............. 180/79.1, 140, 148, 180/151; 280/91; 318/648, 653

[56] References Cited

U.S. PATENT DOCUMENTS

| | | | |
|---|---|---|---|
| 4,715,461 | 12/1987 | Shimizu | 180/79.1 |
| 4,719,396 | 1/1988 | Shimizu | 318/432 |
| 4,742,882 | 5/1988 | Shimizu et al. | 180/79.1 |
| 4,771,843 | 9/1988 | Shimizu | 180/79.1 |
| 4,819,170 | 4/1989 | Shimizu | 364/424.05 |
| 4,842,090 | 6/1989 | Shimizu | 180/140 |
| 4,853,672 | 8/1989 | Yasuda et al. | 180/79.1 |
| 4,856,608 | 8/1989 | Adams | 180/79.1 |
| 4,981,189 | 1/1991 | Wilder | 180/148 |
| 4,987,788 | 1/1991 | Bausch | 180/140 |

FOREIGN PATENT DOCUMENTS

| | | | |
|---|---|---|---|
| 207773 | 8/1988 | Japan | 180/140 |
| 164082 | 10/1988 | Japan | |
| 1-19478 | 5/1989 | Japan | 180/140 |
| 1-79070 | 12/1989 | Japan | |

Primary Examiner—Mitchell J. Hill
Attorney, Agent, or Firm—Irving M. Weiner; Joseph P. Carrier; Pamela S. Burt

[57] ABSTRACT

An electric power steering system which additionally includes a radial arm extending from a steering rod, an axial shaft extending in parallel with the axial center line of the steering rod, an axial bore formed in the casing of the system for guiding axial movement of the axial shaft substantially without any play, and a spring member urging the axial shaft against a side wall of the axial bore. Thus, rotation of the steering rod around its axial center line may be prevented with a relatively small force. Therefore, no excessive force needs to be applied to the axial shaft, and the axial shaft would not encounter any substantial resistance to its axial movement. The axial shaft may be provided with a groove extending along one side thereof in parallel with the axial central line of the axial shaft and provided with a bottom surface which slopes along its lengthwise direction, and the casing may support a steering rod displacement sensor having a spring-loaded retractable plunger serving as a measuring end and abutting the sloping bottom surface of the groove. Thus, the steering rod displacement sensor may be provided with a simple structure which makes it suitable to be mounted in a very limited space in the power steering system. If desired, the steering rod displacement sensor may also serve as the spring member for removing play between the axial shaft and its axial bore. This electric power steering system is suitable for use in front and rear wheel steering vehicles.

7 Claims, 5 Drawing Sheets

ELECTRIC POWER STEERING SYSTEM

TECHNICAL FIELD

The present invention relates to an electric power steering system for vehicles, and in particular to an electric power steering system in which a rotational power of an electric motor is converted into a linear, movement of a steering rod coupled to a corresponding wheel at each end thereof. The electric power steering system of the present invention is particularly suitable for steering rear wheels of front and rear wheel steering vehicles in which the rear wheels are steered in a certain relationship with the front wheels.

BACKGROUND OF THE INVENTION

It has been previously proposed to use an electric power steering system for steering the steerable wheels of a vehicle by actuating a steering rod connected to the wheels at either end via a tie rod and a knuckle arm, along its axial direction. For instance, according to Japanese utility model laid open publication No. 1-179070 (two of the inventors of the present application are also inventors of this Japanese utility model application), an electric motor is disposed around a steering rod and the rotational movement of the electric motor is converted into the axial movement of the steering rod via a ball and screw mechanism.

In such a structure, it is necessary to prevent the rotation of the steering rod around its axial center in order to achieve a precise control of the axial movement of the steering rod. According to the aforementioned Japanese utility model application, it was proposed to provide a rotation preventing shaft which extends in parallel with the steering rod at a certain distance from the steering rod and is slidably received in a guide fixedly provided in the casing of the electric power actuator. However, this proposal did not offer a complete solution to the problem of preventing the turning of the steering rod around its axial center because a certain clearance was inevitable between the guide and the rotation preventing shaft.

In such an electric power steering system, it is highly desirable to minimize its external dimensions as it is typically mounted in a limited space in a lower part of the vehicle body, and in particular it is desired to reduce its lateral dimensions as much as possible. According to the aforementioned utility model application, a spring-loaded neutralizing unit 12 as well as a differential transformer 46 is attached to one side of the casing of the electric power actuator, and this substantially adds lateral dimensions to the electric power steering system. If the spring-loaded neutralizing unit is mounted on an axial end of the power steering system as proposed in Japanese utility model laid opening publication No. 63-164082 for application to a hydraulic power steering system, its longitudinal dimension is undesirably increased.

Yet another problem in such an electric power steering system is the need for a displacement sensor for measuring the output displacement of the power steering system, typically given as the displacement of a steering rod disposed at the output end of the power steering system, which takes up a substantial space in the system. And, further, in a front and rear wheel steering vehicle, such sensors are required for the front wheels and the rear wheels, and they must have widely different dynamic ranges because the rear wheels are steered by substantially smaller angles than the front wheels. The need for such two different steering angle sensors inevitably contributes to an increase in the manufacturing cost of the steering system for the front and rear wheel steering vehicles.

BRIEF SUMMARY OF THE INVENTION

In view of such problems of the previous proposal and other steering system, a primary object of the present invention is to provide an electric power steering system which is capable of precise control of the steering angle of the wheels that are to be steered by effectively preventing the rotation of the steering rod at the output end of the electric power steering system.

A second object of the present invention is to provide an electric power steering system which is highly compact.

A third object of the present invention is to provide a favorable steering angle sensor for measuring the displacement of the output end of the power steering system, more specifically its steering rod, in a highly accurate and economical way.

These and other objects of the present invention can be accomplished by providing an electric power steering system, comprising: a casing; a hollow rotor shaft rotatably mounted in the casing; an electric motor consisting of a rotor formed around the rotor shaft and a stator formed in a part of an inner circumferential surface of the casing opposing the rotor; a steering rod coaxially received in the rotor shaft in a relatively rotatable manner and axially slidable manner, each outer end of the steering rod being coupled with an associated steerable wheel; power transmission means provided between an end of the rotor shaft and an associated part of the steering rod for converting a rotational movement of the rotor shaft into an axial movement of the steering rod; and means for preventing rotational movement of the steering rod around its axial center line; the rotation preventing means comprising a radial arm extending radially from the steering rod, an axial shaft extending in parallel with the axial center line of the steering rod, an axial bore formed in the casing for guiding axial movement of the axial shaft substantially without any play, and spring means urging the axial shaft against a side wall of the axial bore.

Thus, rotation of the steering rod may be prevented with a relatively small force. Therefore, no excessive force is applied to the axial shaft of the rotation preventing means, and the shaft would not encounter any substantial resistance to its axial movement.

Preferably, the casing is further provided with a lateral bore communicated with the axial bore and receiving the spring means for applying a biasing force on a side surface of the axial shaft slidably received in the axial bore. The axial shaft may be provided with a groove extending along one side thereof in parallel with the axial central line of the axial shaft and provided with a bottom surface which slopes along its lengthwise direction, and the casing supports a steering rod displacement sensor having a spring-loaded retractable plunger serving as a measuring end and abutting the sloping bottom surface of the groove.

Thus, the steering rod displacement sensor may be provided with a simple structure which makes it suitable to be mounted in a very limited space in the power steering system. If desired, the steering rod displacement sensor may also serve as the spring means for removing play between the rotation preventing shaft and its guide.

According to a structurally preferred embodiment of the present invention, a bush member having a relatively small friction is interposed between the rotor shaft and the steering rod at the other end of the rotor shaft remote from the power transmission means. Thus, the steering rod is favorably supported, and friction between the rotor shaft and the steering rod can be reduced. Typically, the power transmission means consists of a ball and screw mechanism including a screw thread provided around the steering rod, and a multiplicity of balls received in a spiral groove provided in an inner circumferential surface of a sleeve integrally and coaxially coupled to the rotor so as to mesh with the screw thread of the steering rod.

Preferably, the electric power steering system should be equipped with neutralizing means for restoring the steering rod to its neutral position when the electric motor is not operable. To minimize both the longitudinal and lateral dimensions of the power steering system, the neutralizing means preferably comprises a coaxial and cylindrical support member fixedly secured to the steering rod, a pair of annular flanges projecting radially and outwardly from either end of the support member; a pair of spring seat members fitted on the support member so as to be slidable along the support member between the flanges; a pre-compressed compression coil spring interposed between the spring seat members in a coaxial relationship with the support member; a pair of stoppers provided in the casing to engage outer ends of the spring seat members, respectively; each of the stoppers provided in the casing coinciding with an associated one of the annular flanges provided on the support member when the steering rod is at its neutral position. Preferably, an outer end of the sleeve is provided with a reduced diameter portion which is supported by a cylindrical inner casing via a bearing, the cylindrical inner casing being fixedly secured to the casing in a coaxial relationship so as to define an annular space between the inner casing and the outer casing for accommodating this assembly for neutralizing the electric power steering system in a highly compact manner. 1

In a front and rear wheel steering vehicle, such as a four wheel steering vehicle, it is necessary to measure the steering angles of both the front and rear wheels. Since the rear wheels are typically steered by a substantially smaller angle than the steering angle of the front wheels, the steering angle sensors for the front and rear wheels are required to have substantially different dynamic ranges, and this increases the cost for such sensors. It is therefore preferred if the steering angle sensors are each provided with displacement converting means for converting a displacement of the corresponding steering rod to a corresponding displacement of the corresponding detecting end at a ratio which places the displacement of the detecting end to be substantially in a same range as the displacement of the detecting end of the other of the steering angle sensors. This can be conveniently achieved by using a lever mechanism, a slope and so on. According to a particularly preferred embodiment of the present invention, for each of the steering angle sensors, a sloping surface is provided in a bottom surface of a groove extending in the direction of movement of the steering rod, and the lengths of the grooves are set differently for the front and rear wheel steering angle sensors whereas the maximum depths of the grooves are set to be substantially the same.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
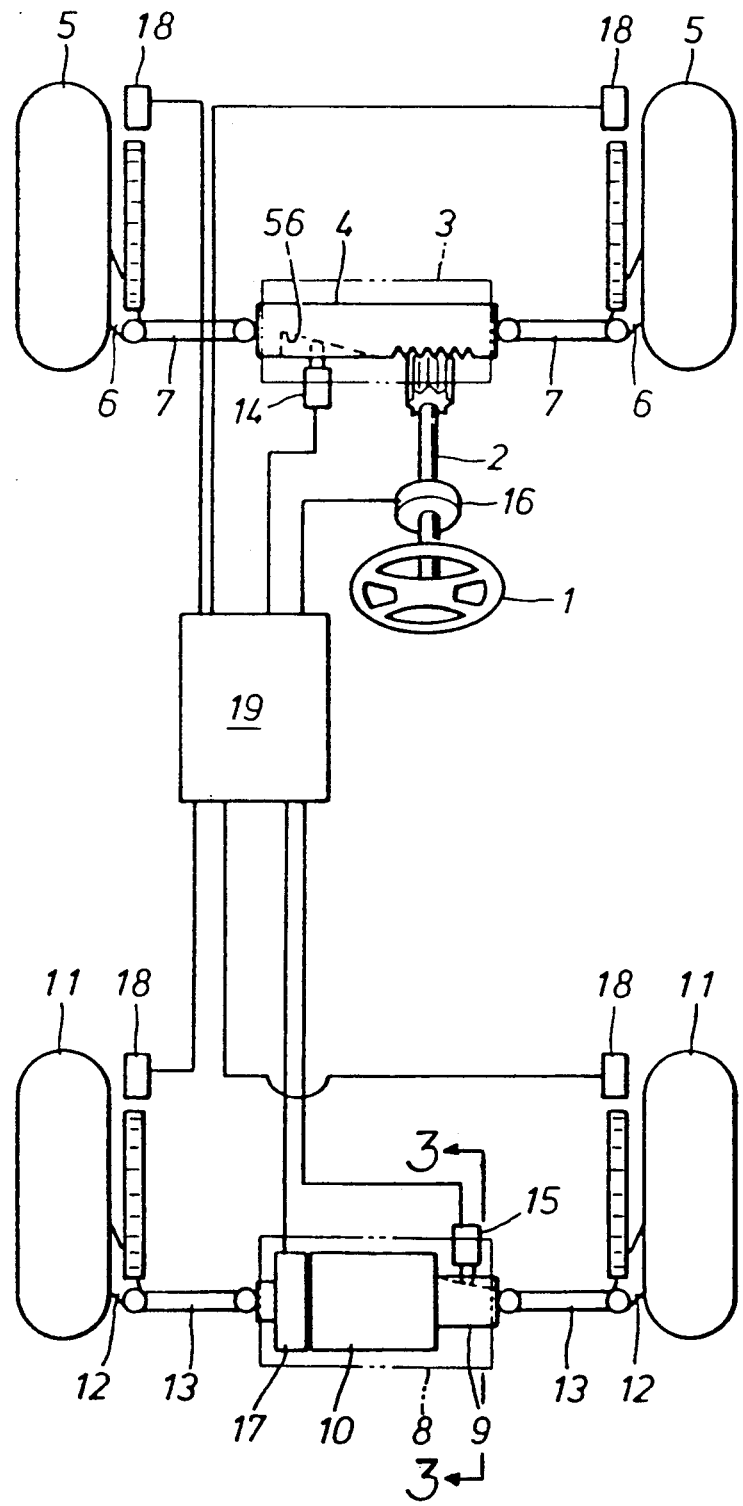
FIG. 1 is a schematic plan view of a front and rear wheel steering vehicle to which the present invention is applied.

FIG. 1 schematically shows a front and rear wheel steering system for a motor vehicle to which the present invention is applied. A steering shaft 2 having a steering wheel 1 fixedly secured to its upper end is mechanically coupled with a steering rod 4 of a front wheel steering unit 3 in a known manner. The two outer ends of the laterally extending steering rod 4 are connected to knuckle arms 6 supporting the left and right front wheels 5 via tie rods 7, respectively. A rear wheel steering unit 8 disposed in a rear part of the vehicle is provided with a steering rod 9 which is actuated by an electric motor 10. The two outer ends of the steering rod 9 for the rear wheels are connected to knuckle arms 12 supporting the rear wheels 11 via tie rods 13, respectively, in a similar manner as the steering rod 4 for the front wheels 5.

Each of the steering units 3 and 8 is provided with a steering angle sensor 14 or 15 consisting of a differential transformer to measure the steering angle of the wheels 5 or 11 by detecting the position of the steering rod 4 or 9. The steering shaft 2 is provided with a steering angle sensor 16 consisting of a rotary encoder for detecting the rotational angle and the direction of rotation of the steering wheel 1, and the rear wheel steering unit 8 is provided with a steering angle sensor 17 consisting of a rotary encoder for detecting the rotational angle and the direction of the rotational movement of the electric motor 10. Each of the wheels 5 and 11 is provided with a vehicle speed sensor 18. These sensors 14 through 18 are electrically connected to a computer unit 19 for controlling the electric motor 10.

When the steering wheel 1 is operated by a driver, the front wheels 5 are mechanically steered via the steering rod 4, and, at the same time, information on the rotational angle of the steering wheel 1 and the displacement of the steering rod 4 is supplied to the computer unit 19 via the corresponding steering angle sensors 16 and 14. Based on the steering conditions of the front wheels 5, and the vehicle speed detected by the vehicle speed sensors 18, the computer unit 19 appropriately determines the steering angle of the rear wheels 11, and actuates the electric motor 10 accordingly. Information on the rotational angle and the direction of rotation of the electric motor 10 and the actual displacement of the steering rod 9, or the actual steering angle of the rear wheels 11 is supplied to the computer unit 19 via the steering angle sensors 15 and 17, and the steering angle of the rear wheels 11 is optimally controlled by the computer unit 19 by feedback control.

Figure 2:
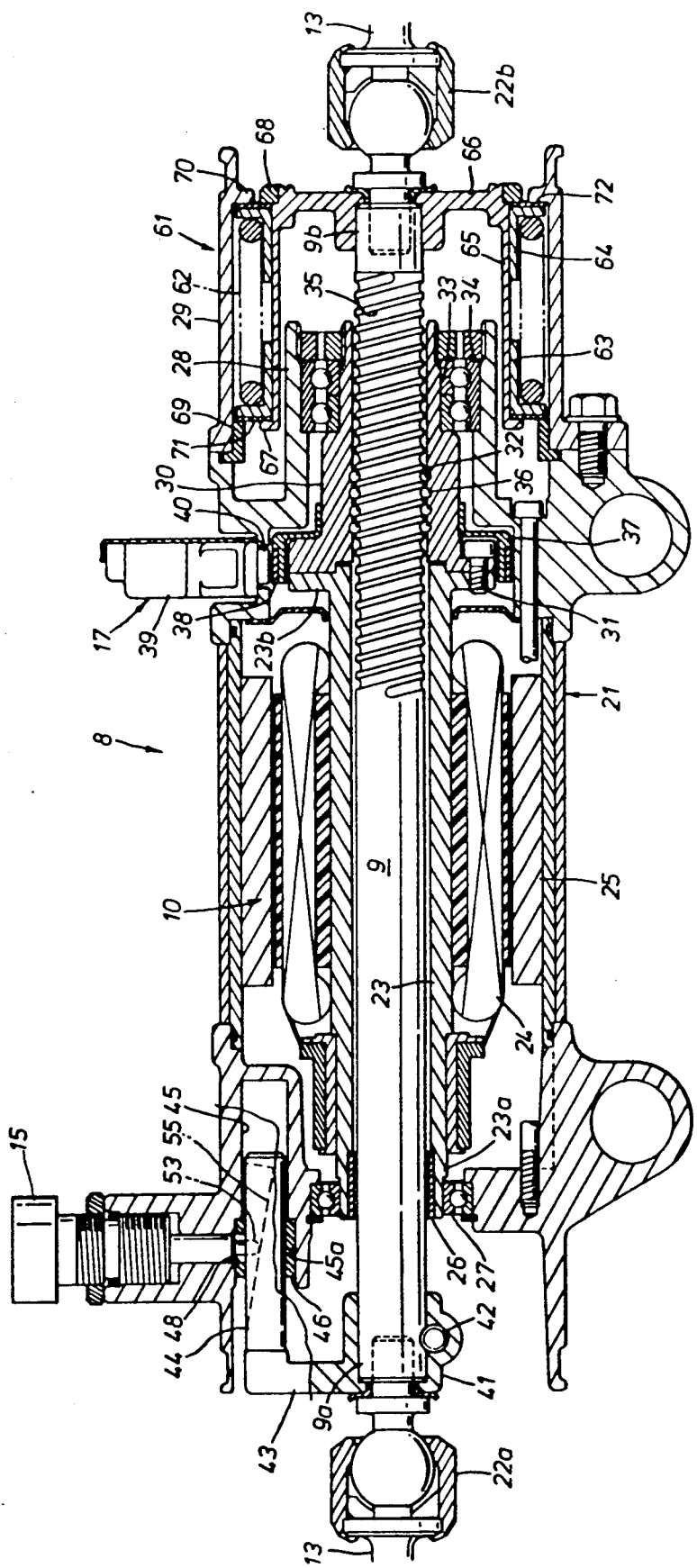
FIG. 2 is a sectional view of a preferred embodiment of the electric power steering system according to the present invention.

FIG. 2 is a sectional view taken along a longitudinal axis of the rear wheel steering unit 8 and showing internal structure thereof. The rear wheel steering unit 8 is provided with the steering rod 9 which is coaxially passed through a substantially cylindrical casing 21 fixedly secured to the vehicle body, and the tie rods 13 are connected to the two outer ends of the steering rod 9 via ball joints 22a and 22b, respectively. The electric motor 10 is provided with a rotor shaft 23 rotatably supported in the casing 21 in a coaxial manner, a rotor 24 formed on the rotor shaft 23 by winding coils thereon, and a stator 25 consisting of permanent magnets fixedly secured to the inner circumferential surface of the casing 21 opposite to the coils of the rotor 24.

Figure 4:
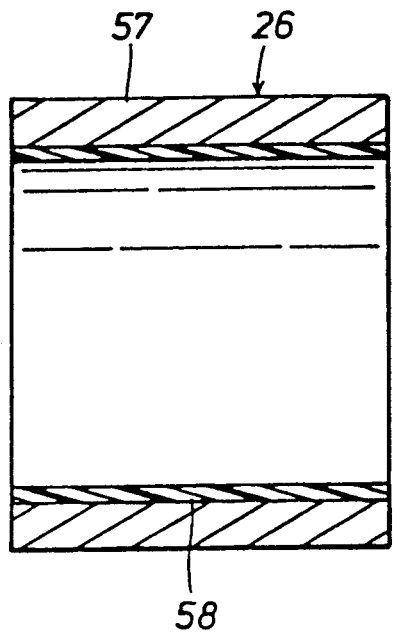
FIG. 4 is an enlarged sectional view of the bush supporting an end of the rotor shaft remote from the ball and screw mechanism.

One end 23a of the rotor shaft 23 is rotatably supported on the steering rod 9 by way of a bush 26 and on the casing 21 by way of a ball bearing 27. The other end 23b of the rotor shaft 23 is connected to a ball and screw mechanism which is described hereinafter. As best illustrated in FIG. 4, the bush 26 consists of a cylindrical metallic member 57 having a small thickness, and its inner circumferential surface is lined with a layer 58 of synthetic resin. Thus, friction between the rotor shaft 23 and the steering rod 9 and resulting noises can be substantially reduced. As will be understood, the bush 26 has a relatively small frictional coefficient.

The other end 23b of the rotor shaft 23 is coaxially and integrally connected to a hollow sleeve 30 by means of threaded bolts 31. The inner circumferential surface of the sleeve 30 is provided with a spiral groove 32. The other end of the sleeve 30 is formed as a reduced diameter portion 33 which is rotatably supported in the inner cylindrical part 28 of the casing 21 by means of a ball bearing 34. The right end of the steering rod 9 as seen in FIG. 2 is provided with a thread 35 which meshes with a large number of steel balls 36 received in the spiral groove 32 in the manner of the known ball and screw mechanism. Therefore, when the rotor shaft 23 is rotated by the electric motor 10 which is in turn controlled by the computer unit 19, the rotation of the rotor shaft 23 is converted into a linear axial movement of the steering rod 9, and this linear movement of the steering rod 9 is transmitted to the rear wheels 11 via the tie rods 13.

The rotor shaft 23 is supported by the bush 26 at its one end, but its rigidity is not substantially reduced as compared to the case in which the rotor shaft 23 is supported on the steering rod 9 over its entire length. Also, since the frictional resistance between the rotor shaft 23 and the steering rod 9 can be reduced by reducing the area of contact therebetween, smooth operation of the motor is made possible, and an improvement in the dynamic response of the steering unit can be accomplished. Further, since the bush 26 produces a sealing effect to shut off the interior of the rotor shaft 23, the durability of the ball and screw mechanism mounted on the other end 23b of the rotor shaft 23 can be improved. Also, since the steering rod 9 is supported by the casing 21 by way of the bush 26, the rotor shaft 23 and the ball bearing 27, there is no need to provide any special support structure for the steering rod 9, and the lateral dimension of the steering system with respect to the vehicle body or the dimension of the steering device along the longitudinal direction of the steering rod 9 can be reduced.

A plurality of permanent magnets 38 are fixedly secured around a cylindrical member 37 securely attached to the sleeve 30 at equal interval along its circumferential direction. The part of the casing 21 opposing these permanent magnets 38 is provided with an encoder main body 39 which includes a magnetic sensor 40 projecting into the casing 21 so as to be in close proximity of the permanent magnets 38 and to form the steering angle sensor 17 in cooperation with the permanent magnets 38. Thus, as the sleeve 30 is rotated by the electric motor 10, the magnetic sensor 40 produces a signal according to the change in the magnetic field caused by the rotation of the permanent magnets 38, and the computer unit 19 determines the rotational angle and the direction of rotation of the electric motor 10 which correspond to the steering angle and the direction of steering of the rear wheels 11, respectively.

The other end 9a of the steering rod 9 remote from the ball and screw mechanism is connected to the tie rod 13 via the ball joint 22a, and a rotation preventing member 41 is securely held to the end portion of the steering rod 9 by way of the ball joint 22a which is secured to the end portion of the steering rod 9 by a threaded bolt 42.

Figure 3:
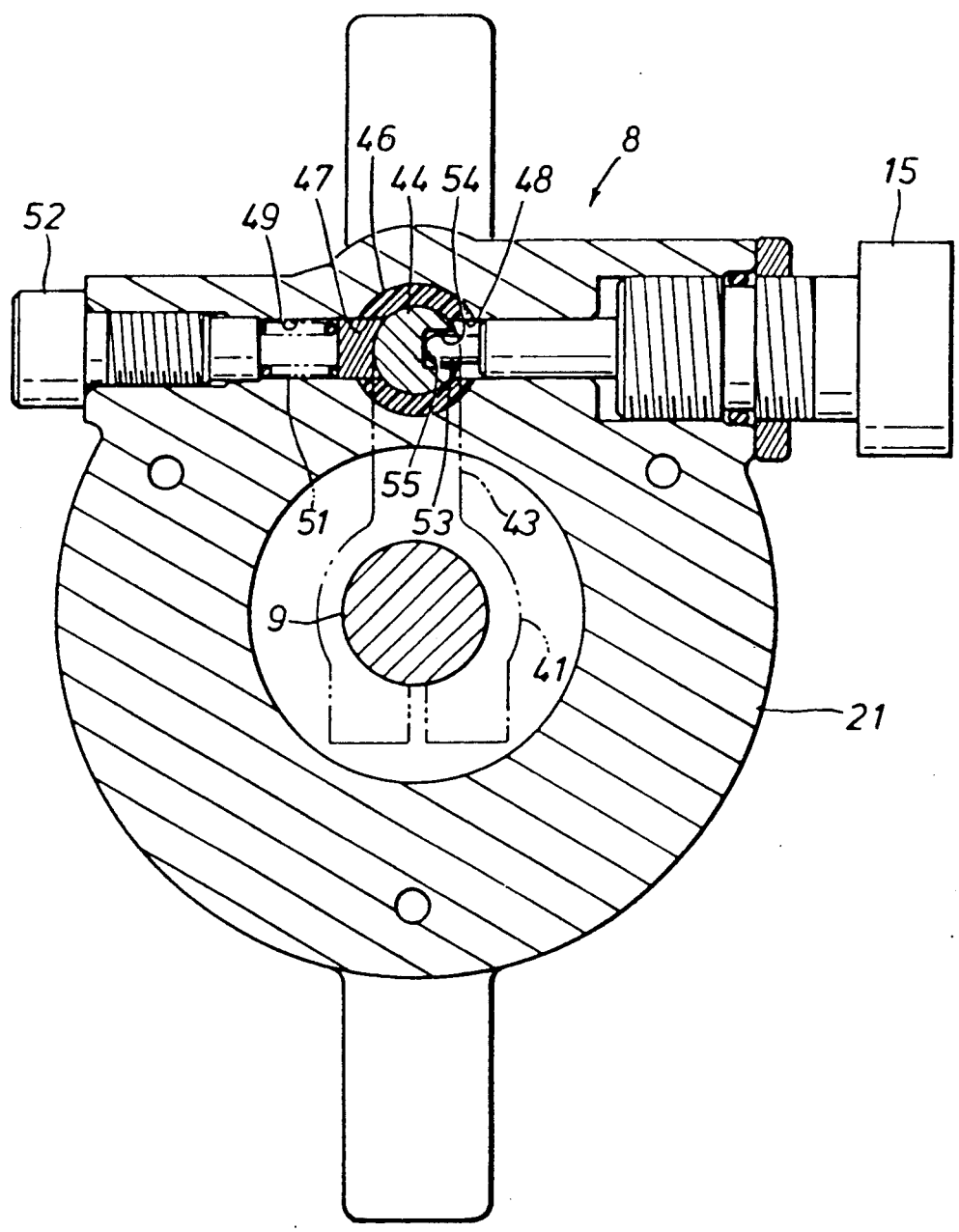
FIG. 3 is a cross sectional view taken along line 3—3 of FIG. 1.

Referring to FIG. 3 which is a sectional view taken along a line 3—3 of FIG. 1, the rotation preventing member 41 comprises an arm 43 extending radially from the steering rod 9, and a rotation preventing axial shaft 44 extending from a free end of the arm 43 in parallel with the steering rod 9. The rotation preventing axial shaft 44 is received in a guide bore 45 formed in the casing 21. An inlet end 45a of the guide bore 45 having a slightly larger diameter is lined by a sleeve 46 made of synthetic resin so as to guide the longitudinal movement of the rotation preventing axial shaft 44 following the movement of the steering rod 9 as a slide bearing. Thus, the rotation preventing axial shaft 44 can move substantially without any play so as to ensure a smooth axial movement of the rotation preventing axial shaft 44 and prevent generation of noises when the steering rod 9 is actuated. Alternatively, the sleeve 46 may consist of a metallic cylinder which is lined with layers of synthetic resin on its inner and outer circumferential surfaces.

The sleeve 46 is provided with a pair of openings 47 and 48 passed laterally across the sleeve 46 at diametrically opposed positions. The casing 21 is provided with a lateral bore 49 having a same diameter as one of the openings 47 and extending in the housing 21 along a circumferential direction of the steering rod 9 and perpendicular to the arm 43 until it opens out into the inlet end 45a of the guide bore 45. The sleeve 46 is disposed in such a manner that the opening 47 coincides with the lateral bore 49 of the casing 21.

The lateral bore 49 slidably receives a pressure member 50 having a curved end surface conforming with the outer circumferential surface of the rotation preventing axial shaft 44. The pressure member 50 is urged toward the right hand side as seen in FIG. 3 by a compression coil spring 51 disposed in the lateral bore 49, and its end surface abuts the outer circumferential surface of the rotation preventing axial shaft 44 thereby urging the rotation preventing axial shaft 44 in the circumferential direction. A sheet of synthetic resin involving a relatively small friction may be secured on the end surface of the pressure member 50 to reduce the friction between the pressure member 50 and the rotation preventing axial shaft 44.

The biasing force of the compression coil spring 51 may be adjusted by turning a set screw 52 which is threaded into the casing 21. As shown in FIG. 3, since the pressure member 50 is passed into the opening 47 after passing through the lateral bore 49 before it finally abuts the outer circumferential surface of the rotation preventing axial shaft 44, the pressure member 50 also has the function to retain the sleeve 46 at a prescribed position in the inlet portion 45a of the guide bore 45.

The casing 21 is provided with a steering angle sensor 15 at a diagonally opposed position of the guide bore 45 with respect to the set screw 52. The steering angle sensor 15 consists of a differential transformer as mentioned earlier, and includes three coil windings and a movable core therein. A plunger 53 projecting from the free end of the steering angle sensor 15 is urged outwardly by an internal spring not shown in the drawings, and the free end of this plunger 53 abuts a bottom surface 55 of a groove 54 extending longitudinally in the outer circumferential surface of the rotation preventing axial shaft 44.

Thus, the rotation preventing axial shaft 44 is subjected to both the urging force of the compression coil spring 51 via the pressure member 50 and the urging force of the internal spring of the steering angle sensor 15 which are directed in opposite direction along the circumferential direction of the shaft 44. Furthermore, since the points of action of the urging forces acting upon the rotation preventing axial shaft 44 are substantially spaced from the axial center of the steering rod 9, it is possible to apply a relatively large torque in the direction to oppose the rotational movement of the steering rod even when the urging forces themselves may not be very large. As a result, it becomes possible to prevent the rotation of the steering rod 9 while minimizing the friction between the pressure member 50 and the rotation preventing axial shaft 44. Alternatively, it is possible to prevent the rotation of the steering rod 9 by the spring means consisting of the pressure member 50 and the compression coil spring 51 alone or by the steering angle sensor 15 alone.

Referring to FIG. 2, the depth of the longitudinal groove 54 formed in the rotation preventing axial shaft 44 changes at a constant rate along the axial direction or along the movement of the steering rod 9. Therefore, the stroke of the plunger 53 abutting the bottom surface 55 changes in proportion to the change in the depth of the groove 54 which occurs with the longitudinal movement of the steering rod 9 or the rotation preventing axial shaft 44. The steering angle sensor 15 produces a signal corresponding to this displacement of its plunger 53, and the computer unit 19 detects the longitudinal displacement of the steering rod 9 and determines the actual steering angle and the steering direction of the rear wheels 11.

Figure 5:
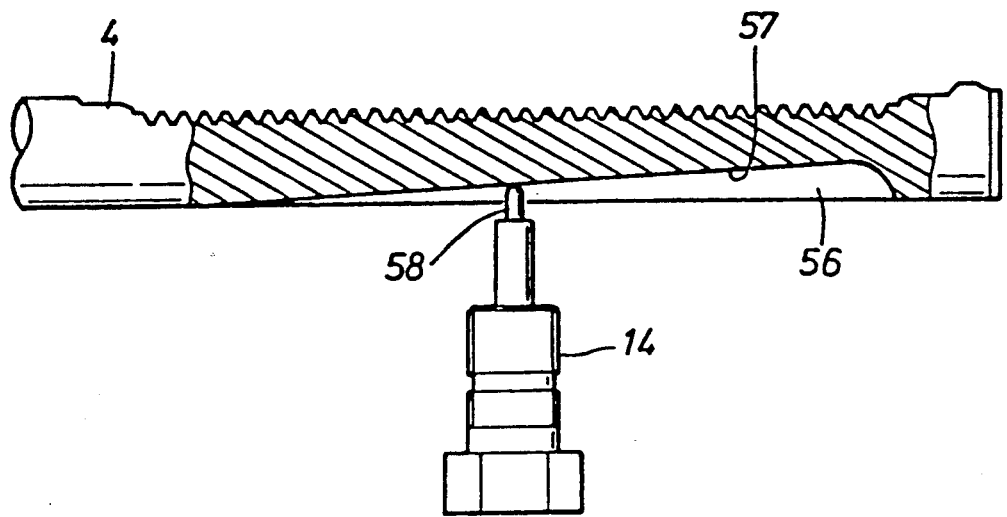
FIG. 5 is a partly broken away front view of the steering rod consisting of a rack, and the steering angle sensor for the front wheels.

As depicted in more detail in FIG. 5, the steering angle sensor 14 for the front steering unit 3 has a similar structure as the steering angle sensor 15 for the rear wheel steering unit 3. In other words, a longitudinal groove 56 having a bottom surface 57 inclining at a constant rate is formed in the outer circumferential surface of the steering rod 4, and a plunger 58 urged outwardly from the steering angle sensor 14 abuts this bottom surface 57. However, since the front wheels 5 are normally steered by a substantially larger steering angle than the rear wheels 11, there is a large difference in the displacements of the two steering rods 4 and 9. Therefore, if the maximum depths of the groove 56 for the front wheel steering rod 4 and the groove 54 of the rear wheel steering rod 9 are the same, and their longitudinal lengths are proportional to the maximum strokes of the corresponding steering rods 4 and 9, respectively, sensors of a same stroke may be used for the steering angle sensors 14 and 15. This offers advantages in the simplification of the stocking of the steering angle sensors and reduction of the unit manufacturing cost of the steering angle sensors.

As shown in FIG. 2, the rear wheel steering unit 8 is provided with a fail-safe mechanism or a neutralizing mechanism 61 for restoring the steering rod 9 to a neutral position. In this neutralizing mechanism 61, a precompressed compression coil spring 62 is wound around a cylindrical support member 65 by way of a pair of spring seat members 63 and 64 disposed on either end of the compression coil spring 62. The support member 65 is accommodated in an annular space defined by the inner cylindrical part 28 and a cylindrical extension 29 of the outer casing 21, and is provided with a coaxial disk member 66 at its outer end, and this disk member 66 is coaxially and fixedly secured to the corresponding end 9b of the steering rod 9 by way of the ball joint 22b so as to be integral with the steering rod 9.

Owing to the provision of the reduced diameter portion 33 in the sleeve 30, the diameter of the inner cylindrical part 28 may be sufficiently reduced so as to define the annular space for accommodating the cylindrical support member 65 between the outer casing extension 29 and the cylindrical part 28. Since the diameter of the compression coil spring 62 is maximized for the given outer diameter of the casing extension 29 and its length is minimized by making use of the annular space defined around the ball and screw mechanism, it is possible to obtain a sufficiently large spring force without unduly increasing the external dimensions of the rear wheel steering unit 8. Thus, it is possible to reduce both the outer diameter and the length of the rear wheel steering unit 8 for a given neutralizing force.

The spring seat members 63 and 64 are slidably fitted on the outer circumferential surface of the cylindrical support member 65, and axial movement of the seat members restricted by an annular stopper 67 formed in the inner end of the cylindrical support member 65 and another annular stopper 68 secured to the outer circumference of the disk member 66. Further, the movement of the spring seat members 63 and 64 are also restricted by the stoppers 69 and 70 consisting of annular flanges provided in the inner circumferential surface of the casing extension 29. The axial distance between the two spring seat members 63 and 64 determine the limit of the compression of the compression coil spring 62.

Since the support member 65 may be finished with a high precision, it is possible to ensure a sufficient dimensional precision without requiring any special adjustment mechanism as compared with the case of providing a stopper directly on the steering rod 9 and mounting a compression coil spring 62 thereon. Since, the outer end surfaces of the spring seat members 63 and 64 are provided with layers 71 and 72 of resilient polymer material, the impact between the seat members 63 and 64 and the stoppers 67 through 70 are controlled, and generation of impulsive noises can be avoided.

When the steering rod 9 is moved to the right in FIG. 2, the left spring seat member 63 also moves to the right by virtue of the stopper 67 of the support member 65, but the other spring seat member 64 on the right is engaged by the stopper 70 of the casing extension 29. Therefore, the return compression coil spring 62 is compressed and produces a spring force which urges the steering rod 9 to the left. Conversely, when the steering rod 9 is moved to the left in FIG. 2, the spring seat member 64 on the right hand side moves to the left along with the steering rod 9 by virtue of the outer stopper 68 of the support member 65, but the spring seat member 63 on the left hand side is engaged by the stopper 69 of the casing extension 29. Therefore, the compression coil spring 62 applies a rightward spring force upon the steering rod 9. Thus, the compression coil spring 62 applies a return force without regard to the direction in which the steering rod 9 is displaced.

Thus, according to this embodiment, since the rotation preventing shaft is spaced from the axial center of the steering rod, it is possible to prevent the rotation of the steering rod with a relatively small force. Further, by applying a small biasing force on this rotation preventing shaft, it is possible to eliminate play in the rotation preventing shaft without increasing friction against its longitudinal movement. Further, by using a tubular bush for guiding the longitudinal movement of the steering shaft at a certain distance from the part of the steering rod which is coupled to a ball and screw mechanism, it is possible to ensure a stable and noiseless support of the steering rod without involving excessive friction.

Figure 6:
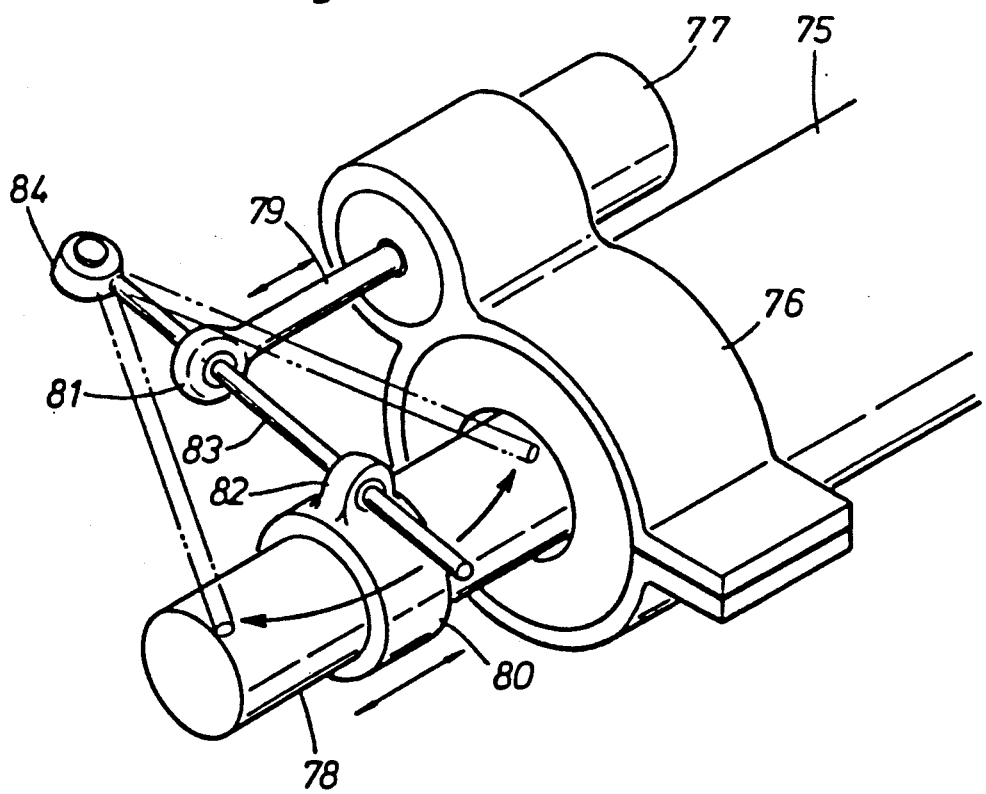
FIG. 6 is a perspective view of an alternate embodiment of the steering angle sensor.

FIG. 6 shows an alternate embodiment of the steering displacement sensor according to the present invention. A steering angle sensor 77 similar to the steering angle sensors 14 and 15 is mounted, by means of a stay member 76, on an end of a casing 75 of a wheel steering unit which is fixedly secured to the vehicle body. The steering angle sensor 77 is internally provided with a differential transformer, and its core member (not shown in the drawings) is connected to a plunger 79 axially projecting from the steering angle sensor 77. An exposed external end of a steering rod 78 extending out of the casing 75 carries a connecting bracket 80.

The free end of the plunger 79 and a part of the connecting bracket 80 are provided with ball joints 81 and 82, respectively, and a lever member 83 having its base end 84 pivotally connected to a fixed part of the vehicle body is slidably passed through these ball joints 81 and 82. As depicted in FIG. 6, the ball joint 82 of the connecting bracket 80 is engaged to a free end portion of the lever member 83 while the ball joint 81 of the plunger 79 is engaged to an intermediate part of the lever member 83.

Thus, the linear displacement of the steering rod 78 causes a swinging movement of the lever member 83 around its base end 84 as indicated by the arcuate arrows, and this causes a linear displacement of the plunger 79. However, by virtue of the use of the lever member 83, the displacement of the steering rod 78 is converted into the displacement of the plunger 79 by a reduced ratio as determined by the lever ratio between the two members. Therefore, according to this embodiment also, it is possible to use a relatively small displacement sensor for a given stroke of the steering rod.

Figure 7:
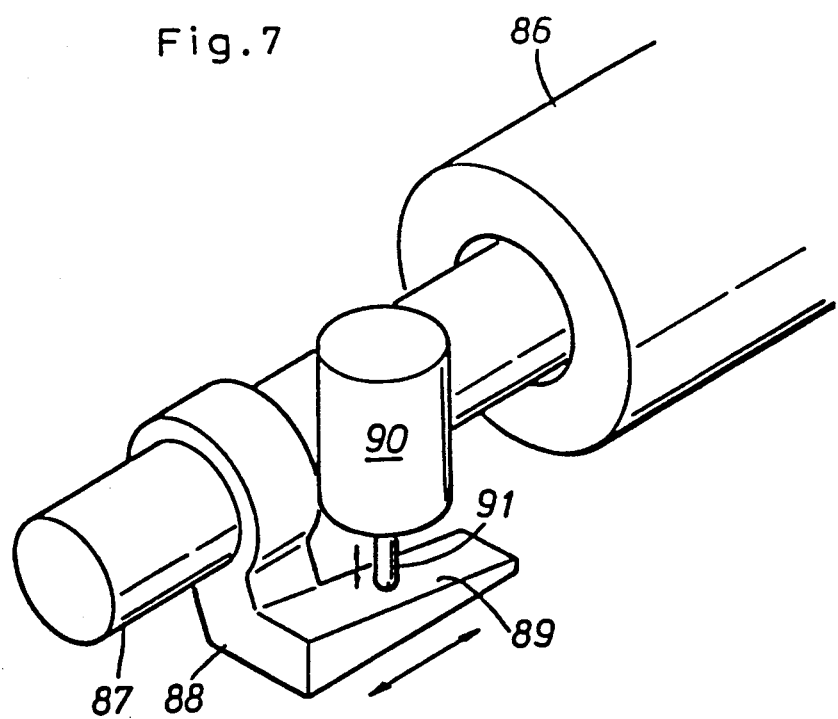
FIG. 7 is a perspective view of another alternate embodiment of the steering angle sensor.

FIG. 7 illustrates yet another alternate embodiment of the steering rod displacement sensor according to the present invention. In this embodiment, a displacement converting member 88 is fixedly secured to a steering rod 87 extending out of a casing 86 of a steering unit. The displacement converting member 88 is provided with a sloping surface 89 having a length corresponding to the full stroke of the steering rod 87, and a spring loaded plunger 91 of a steering angle sensor 90 fixedly secured to the vehicle body abuts this sloping surface 89. Thus, according to this embodiment also, as the steering rod 87 moves axially into and out of the casing 86, the plunger 91 is moved into and out of the steering angle sensor 90 according to the condition of the sloping surface 89. By appropriately changing the inclination of the sloping surface 89 and/or changing the inclination of the plunger 91 with respect to the sloping surface 89, it is possible to obtain desired displacement conversion properties such as the conversion ratio and the mathematical functional relationship between the displacements of the steering rod 87 and the plunger 91.

Although the present invention has been described in terms of specific embodiment, it is possible to modify and alter details thereof without departing from the spirit of the present invention.

We claim:

1. An electric power steering system, comprising:
a casing;
a hollow rotor shaft rotatably mounted in said casing;
an electric motor consisting of a rotor disposed around said rotor shaft and a stator disposed in a part of an inner circumferential surface of said casing opposing said rotor;
a steering rod coaxially received in said rotor shaft in a relatively rotatable manner and axially slidable manner, each outer end of said steering rod being coupled with an associated wheel that is intended to be steered;
power transmission means provided between an end of said rotor shaft and an associated part of said steering rod for converting a rotational movement of said rotor shaft into an axial movement of said steering rod around its axial center line;
said rotation preventing means comprising a radial arm extending from said steering rod, an axial shaft extending in parallel with said axial center line of said steering rod, an axial bore defined in said casing for guiding axial movement of said axial shaft substantially without any play, and spring means urging said axial shaft against a side wall of said axial bore.

2. An electric power steering system according to claim 1, wherein said casing is further provided with a lateral bore communicated with said axial bore and receiving said spring means for applying a biasing force on a side surface of said axial shaft slidably received in said axial bore.

3. An electric power steering system according to claim 1, wherein said axial shaft is provided with a groove extending along one side thereof in parallel with said axial central line of said axial shaft and provided with a bottom surface which slopes along its lengthwise direction, and said casing supports a steering rod displacement sensor having a spring-loaded retractable plunger serving as a measuring end and abutting said sloping bottom surface of said groove.

4. An electric power steering system according to claim 1, comprising neutralizing means for restoring said steering rod to its neutral position when said electric motor is not operable, said neutralizing means comprising a coaxial and cylindrical support member fixedly secured to said steering rod, a pair of annular flanges projecting radially and outwardly from either end of said support member; a pair of spring seat members fitted on said support member so as to be slidable along said support member between said flanges; a precompressed compression coil spring interposed between said spring seat members in a coaxial relationship with said support member; a pair of stoppers provided in said casing to engage outer ends of said spring seat members, respectively; each of said stoppers provided in said casing coinciding with an associated one of said annular flanges provided on said support member when said steering rod is at its neutral position.

5. An electric power steering system according to claim 4, wherein an outer end of said sleeve is provided with a reduced diameter portion which is supported by a cylindrical inner casing via a bearing, said cylindrical inner casing being fixedly secured to said casing in a coaxial relationship so as to define an annular space between said inner casing and said casing for accommodating at least a part of an assembly consisting of said support member, said compression coil spring and said spring seat members.

6. An electric power steering system according to claim 1, including a bush member having a small frictional coefficient and interposed between said rotor shaft and said steering rod at the other end of said rotor shaft remote from said power transmission means.

7. An electric power steering system according to claim 6, wherein said power transmission means consists of a ball and screw mechanism including a screw thread provided around said steering rod, and a multiplicity of balls received in a spiral groove provided in an inner circumferential surface of a sleeve integrally and coaxially coupled to said rotor so as to mesh with said screw thread of said steering rod.

* * * * *

UNITED STATES PATENT AND TRADEMARK OFFICE
CERTIFICATE OF CORRECTION

PATENT NO. : 5,135,067
DATED : August 4, 1992
INVENTOR(S) : Takashi Kohata; Masaru Abe; and Ikuo Nonaga It is certified that error appears in the above-identified patent and that said Letters Patent is hereby corrected as shown below:

Column 2, line 9, change "system" to -- systems --.
Column 3, line 43, delete "1".
Column 7, line 28, change "direction" to -- directions --.
Column 8, line 9, delete "the" (first occurrence);
    line 45, after "members" insert -- is --;
    line 60, delete the comma.
Column 10, line 17, change "embodiment" to -- embodiments --;
    line 37 (claim 1, line 17), after "rod" insert -- ; and means for preventing rotational movement of said steering rod --;
    line 62 (claim 4, line 2), after "1," insert -- further --.

Signed and Sealed this

Seventh Day of September, 1993

*Attest:*

BRUCE LEHMAN

*Attesting Officer*     *Commissioner of Patents and Trademarks*